United States Patent [19]

Swaroop et al.

[11] 4,256,140
[45] Mar. 17, 1981

[54] TWO-PIECE HOT RUNNER MANIFOLD

[75] Inventors: Nareshwar Swaroop, Mt. Vernon, Ohio; Frederick L. Stone, Woodbury, Conn.

[73] Assignee: The Continental Group, Inc., New York, N.Y.

[21] Appl. No.: 100,804

[22] Filed: Dec. 6, 1979

[51] Int. Cl.³ .............................................. B29F 3/04
[52] U.S. Cl. ............................ 137/561 A; 425/192 R
[58] Field of Search ................... 137/561 A; 264/328; 425/192 R, 257; 249/81, 110, 119

[56] References Cited

U.S. PATENT DOCUMENTS

| | | | |
|---|---|---|---|
| 2,304,461 | 12/1942 | Knowles | 164/314 X |
| 2,339,443 | 1/1944 | Wilson | 425/577 |
| 3,697,211 | 10/1972 | Chisholm | 425/191 |
| 3,704,723 | 12/1972 | Wheaton et al. | 137/561 A X |
| 3,740,179 | 6/1973 | Schmidt | 425/192 |

Primary Examiner—William R. Cline
Attorney, Agent, or Firm—Charles E. Brown

[57] ABSTRACT

This relates to a hot runner manifold for distributing thermoplastic melts from a plasticizer to plural cavities of a mold. The manifold is formed in two parts which include a plate and a ring which are joined along a central parting line in a manner wherein all of the sprue and runner portions may be readily and accurately machined. The ring is shrunk in place on the plate and has an interference fit which is sufficient to prevent separation of the ring from the plate during normal operating conditions without the use of any fasteners.

7 Claims, 2 Drawing Figures

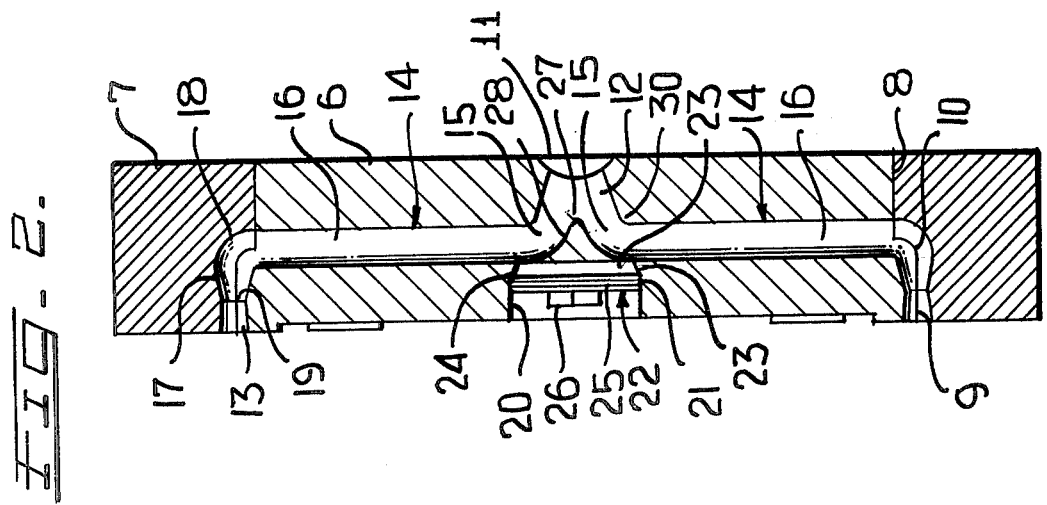
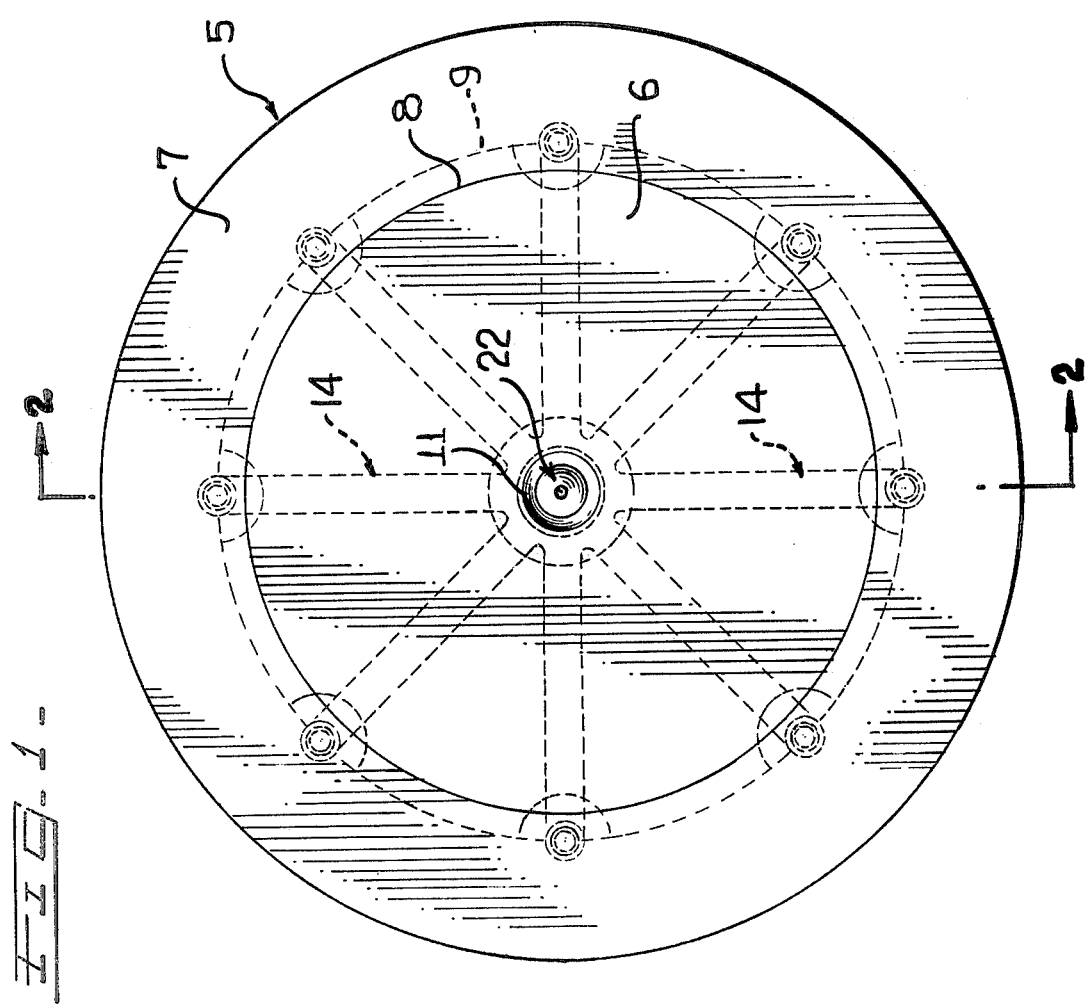

TWO-PIECE HOT RUNNER MANIFOLD

This invention relates in general to new and useful improvements in apparatus for injection molding preforms for the later blow molding of articles. Most particularly, this invention relates to a novel hot runner manifold which distributes the thermoplastic melt from the plasticizer to the individual mold cavities.

Conventional hot runner manifolds have not been successfully employed to produce deep injection molded preforms on a mold cavity tooling with barrier resins of the type including, but not limited to, acrylonitrile. The main problems are containment of high injection pressures (20,000 p.s.i. or more) in two-piece manifolds, machining of the intricate details of runner and sprue configurations in the case of one-piece manifolds, and the obtaining of a proper ratio of hold volume of the manifold to the shot volume of the injection cavities.

In accordance with this invention, it is proposed to provide a two-piece manifold which can contain the high injection pressures, which manifold construction permits the desired ease of machining intricate runner and sprue details while obtaining the desired balanced distribution of the thermoplastic melt.

Most particularly, it is proposed to form the manifold in two parts which include a circular plate and an annular ring with the annular ring having an interference fit within the periphery of the plate of a degree wherein the ring remains fixed under normal operating temperatures and pressures.

Most particularly, the secondary sprues of the manifold are generally centered on a circle and the centers of the secondary sprues are generally disposed along the outer surface of the plate, whereby each secondary sprue is in part formed in the plate and in part formed in the ring. Thus, the split manifold construction permits ease of machining the secondary sprues.

Next, primary runners which radiate from a centrally located primary sprue are in the form of straight bores which extend from the periphery of the plate to the center thereof.

It is also proposed to provide the periphery of the plate with a stepped configuration wherein the step is arcuate in cross section and generally corresponds to the center line of an elbow connecting a first runner portion to a second runner portion and wherein each elbow is primarily formed in the ring so as to facilitate accurate machining of the elbow.

Another feature of the invention is the provision of the plate with a throughbore which in part defines the primary sprue. A plug closes the throughbore with the plug being in the form of a distributor plug for evenly distributing the thermoplastic melt from the primary sprue into the plural runners.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is an elevational view of a hot runner manifold formed in accordance with this invention.

FIG. 2 is a vertical sectional view taken generally along the line 2—2 of FIG. 1.

In the drawings there is illustrated a hot runner manifold which is formed in accordance with this invention, the manifold being generally identified by the numeral 5. It is to be understood that the manifold 5 is to be positioned between a plasticizer (not shown) and a multiple cavity mold (also not shown).

The manifold 5, in accordance with this invention, is of a two-piece construction and includes an inner plate 6 and an outer ring 7. The plate 6 has a stepped periphery which includes a cylindrical surface portion 8 of a first diameter and a cylindrical surface portion 9 of a second and greater diameter. The cylindrical surface portions 8 and 9 are joined together by an annular shoulder 10 of an arcuate cross section.

It will be readily apparent from FIG. 2 that the ring 7 is joined to the plate 6 without the use of any third member and without the use of any fastening elements. In practice, there is an interference fit between the inner peripheral surface of the ring 7 and the outer peripheral surface of the plate 6. This interference fit must be such as to retain the ring on the plate 6 under all expected operating conditions of temperatures and pressures. It is to be understood that the plate 6 and the ring 7 will not be secured to a third member for the purpose of securing the plate and ring together.

It will be seen that the face of the plate 6 which will be seated against the plasticizer has a shallow pocket 11 for receiving the plasticizer nozzle (not shown) in sealed relation. The pocket 11 has extending axially therefrom a primary sprue 12. The face of the manifold 5 which opposes the mold assembly is provided with a plurality of secondary sprues 13 all of which are generally centered on a common circle. The sprues 12 and 13 are joined by suitable runners, generally identified by the numeral 14. Each runner includes a first elbow portion 15 disposed between the primary sprue 12 and a first runner portion 16. The first runner portion 16 is connected to a second runner portion 17 by an elbow 18. The second runner portion 17 opens into the secondary sprue in the illustrated embodiment of the manifold, and there is a breakoff area 19 between the second runner portion 17 and the associated secondary sprue 13 within the manifold. It is to be understood that if the sprue material required by the secondary sprue 13 is to be eliminated, the secondary sprues will be for all practical purposes eliminated, although it is necessary that there be secondary sprues of some extent in all injection molding operations.

It will be seen that each secondary sprue 13 is substantially centered with respect to the cylindrical surface 9 so that each secondary sprue 13 is partially formed in the outer peripheral portion of the plate 6 and partially formed in the inner peripheral surface of the ring 7 which corresponds to the surface 9. In this manner the secondary sprues 13 may be accurately machined due to the ready accessibility of the areas in which the secondary sprues are formed.

The secondary runner portions 17 are also generally centered on the peripheral surface 9 so as to be partially formed in the ring 7 and partially formed in the plate 6. This permits the accurate machining of the tapered outline of the secondary runner portions.

In a preferred embodiment of the invention, for all practical purposes the elbows 18 are formed entirely within the ring 7. It will be seen that the arcuate cross sectional shoulder 10 generally coincides with the center line of each of the elbows 18. It will be readily apparent from the position of the interface between the plate 6 and the ring 7, the elbows 18 may be accurately machined.

Although the first runner portions 16 are formed entirely within the plate 6, it will be seen that they may be readily machined in that they are in the form of simple, constant cross section radiating bores which open radially inwardly from the peripheral surface of the plate 6.

This leaves only the formation of the elbow 15. In accordance with this invention, in the forming of the primary sprue 12, a bore 20 is formed entirely through the plate 6 as is clearly shown in FIG. 2. Where the bore intersects the runner 16 remote from the primary sprue 12, suitable fastening means are provided internally of the bore 20. In the illustrated embodiment of the invention, the bore 20 is internally threaded as at 21. A flow distributor plug, generally identified by the numeral 22, is inserted into the bore 20 and then threaded into position with a tapered portion 23 thereof seating on a like tapered shoulder 24 disposed internally of the threads 21. The plug 22, of course, is provided with external threads 25 for meshing engagement with the threads 21 so as to permit the installation of the plug. Further, in order to permit rotation of the plug 22 for both insertion and removal thereof, the outer end of the plug is provided with a tool engageable multisided boss 26.

The inner end of the plug 22 defines primarily the elbow 15 and is configurated so as to include a central pin-like projection 27 which is surrounded by a concaved surface 28 of a part-toroidal configuration. Inasmuch as the surface 28 is aligned with a corresponding surface of the first runner 16, it will be seen that there is a smooth transition of the flow direction between the primary sprue 12 and the first runners 16.

The bore 20 also permits access to the inner end of the primary sprue 12 so that it may be provided with rounded corners 30 which cooperate with the surface 28 to define the elbow 15.

At this time it is most specifically pointed out that when it is desired to join the ring 7 to the plate 6, the ring is heated to a temperature of about 100° F. higher than that of the plate 6. The ring may then be readily pushed over the plate 6 and after the ring 7 has cooled, it will be sufficiently tightly clamped on the plate 6 without the addition of any additional fasteners so as to withstand all temperature differentials occurring during the operation of an associated molding mechanism and all internal pressures applied by the thermoplastic melt therein.

It is to be understood that the plate 6 and the ring 7 will be provided with the customary heaters for maintaining the temperature of the manifold 5 at the required operating temperature. When it is desired to separate the ring from the plate, the plate is permitted to cool while the ring is continued to be heated. On reaching a temperature differential of about 100° F., the ring 7 is easily removed from the plate 6. This permits the rapid cleaning and polishing of the manifold.

The specific manifold construction permits an efficient runner arrangement wherein the manifold has a small hold volume which avoids thermal degradation of thermally unstable thermoplastics and thus may be used for not only polyacrylonitriles but also polyvinyl chlorides and thermoplastic polyesters.

The manifold 5 has the runner configuration such as to eliminate traps and dead spaces while at the same time the frictional resistance to melt flow in all of the paths are identical. Most particularly, the runner/sprue configurations are such that shear stresses do not change abruptly. A sudden drop in pressure would induce melt instability and problems relating to premature freezing. Also, for thermoplastic melts exhibiting melt fracture the shear stress values may be held well below the critical melt fracture point. By forming the manifold of such a configuration and providing the distributor plug 22, it has been possible to eliminate flow deviations previously found in hot runner manifolds of this type.

Although only a preferred embodiment of the manifold has been specifically illustrated, and although the manifold is particularly constructed for use with an eight-cavity mold, it is to be understood that minor variations may be made in the manifold construction without departing from the spirit and scope of the invention as defined by the appended claims.

We claim:

1. A hot runner manifold for coupling a plasticizer to a plural cavity mold, said manifold having defined therein a central primary sprue opening inwardly into said manifold from one face thereof for receiving plastic material from a plasticizer nozzle, a plurality of secondary sprues opening outwardly from said manifold from an opposite face thereof, a runner extending from said primary sprue to each of said secondary sprues, said secondary sprues being arranged on a common circle, said manifold comprising a circular path having a stepped periphery, a part of said periphery lying on said common circle, and a ring member telescoped over said plate, said secondary sprues being in part formed in said plate and in part formed in said ring, and said ring and said plate having an interference fit of a degree for maintaining said plate and said ring assembled at normal operating temperatures and pressures.

2. The manifold of claim 1 wherein each runner includes a first runner portion connected to said primary sprue, a secondary runner portion connected to a respective secondary sprue, and an elbow interconnecting said first and second runner portions, said first runner portions being formed solely in said plate.

3. The manifold of claim 2 wherein said first runner portions are in the form of straight line constant cross section bores.

4. The manifold of claim 2 wherein said second runner portions are formed in part in said plate and in part in said ring.

5. The manifold of claim 4 wherein said elbows are primarily formed in said ring.

6. The manifold of claim 2 wherein said elbows are primarily formed in said ring.

7. The manifold of claim 6 wherein said stepped periphery includes an intermediate shoulder of arcuate cross section corresponding to a center line of said elbow and said elbow center line lying on said shoulder.

* * * * *